(12) United States Patent
Ebeid et al.

(10) Patent No.: US 8,577,028 B2
(45) Date of Patent: Nov. 5, 2013

(54) SYSTEM AND METHOD FOR PERFORMING EXPONENTIATION IN A CRYPTOGRAPHIC SYSTEM

(75) Inventors: Nevine Maurice Nassif Ebeid, Kitchener (CA); Robert John Lambert, Cambridge (CA)

(73) Assignee: Certicom Corp., Mississauga, Ontario (CA)

( * ) Notice: Subject to any disclaimer, the term of this patent is extended or adjusted under 35 U.S.C. 154(b) by 499 days.

(21) Appl. No.: 12/707,913

(22) Filed: Feb. 18, 2010

(65) Prior Publication Data

US 2010/0223478 A1   Sep. 2, 2010

Related U.S. Application Data

(60) Provisional application No. 61/156,251, filed on Feb. 27, 2009, provisional application No. 61/159,618, filed on Mar. 12, 2009.

(51) Int. Cl.
*H04L 9/32* (2006.01)

(52) U.S. Cl.
USPC ............... 380/30; 380/28; 713/172; 713/174; 713/194

(58) Field of Classification Search
None
See application file for complete search history.

(56) References Cited

U.S. PATENT DOCUMENTS

| | | | |
|---|---|---|---|
| 6,738,478 B1 | 5/2004 | Vanstone et al. | |
| 7,177,423 B2 | 2/2007 | Antipa | |
| 2006/0050868 A1* | 3/2006 | Bockes et al. | 380/28 |
| 2008/0056489 A1 | 3/2008 | Liardet et al. | |
| 2008/0104400 A1* | 5/2008 | Kocher et al. | 713/172 |
| 2008/0226064 A1* | 9/2008 | Douguet et al. | 380/30 |
| 2009/0110187 A1* | 4/2009 | Fischer | 380/28 |
| 2009/0122980 A1* | 5/2009 | Ciet et al. | 380/30 |

FOREIGN PATENT DOCUMENTS

| GB | 2399904 A | 9/2004 |
|---|---|---|
| WO | WO 2007/006810 A1 | 1/2007 |

OTHER PUBLICATIONS

Khoury, Tony; Search Report from corresponding PCT Application No. PCT/CA2010/000208; search completed May 17, 2010.
Menezes, A. et al., Handbook of Applied Cryptography; 1997; pp. 612 to 613; CRC Press.

* cited by examiner

*Primary Examiner* — Jung Kim
*Assistant Examiner* — Adrian Stoica
(74) *Attorney, Agent, or Firm* — Etienne de Villiers; Dimock Stratton LLP

(57) ABSTRACT

There are disclosed systems and methods for computing an exponentiatied message. In one embodiment blinding is maintained during the application of a Chinese Remainder Theorem (CRT) algorithm and then removed subsequent to the completion of the CRT algorithm. In another embodiment, fault injection attacks, such as the gcd attack, can be inhibited by applying and retaining blinding during the application of the CRT algorithm to yield a blinded exponentiation value, and then subsequently removing the blinding in a manner that causes an error injected into the CRT computation to cascade into the exponent of the value used to unblind the blinded exponentiated value.

18 Claims, 6 Drawing Sheets

SYSTEM AND METHOD FOR PERFORMING EXPONENTIATION IN A CRYPTOGRAPHIC SYSTEM

CROSS-REFERENCE TO RELATED APPLICATIONS

This application claims priority from U.S. Provisional Application No. 61/156,251 filed on Feb. 27, 2009, and from U.S. Provisional Application No. 61/159,618 filed on Mar. 12, 2009. Both of these provisional applications are incorporated herein by reference.

TECHNICAL FIELD

The following relates generally to cryptographic systems, and methods of performing exponentiation in such systems.

BACKGROUND

A cryptographic system is a computer system that uses cryptography, typically to secure or authenticate data communication between a pair of computing devices connected to one another through a data communication link in the system. Each computing device has a cryptographic unit with the processing capacity to implement one or more cryptographic algorithms used to secure or authenticate the data communication. The cryptographic algorithms typically perform arithmetic operations on the bit strings representing parameters, messages, or data in the protocols to produce a bit string representing the output from the protocol.

Cryptographic systems may be subject to a variety of attacks by an interloper who wishes to obtain secret information. Some of these attacks are based on the physical implementation of a cryptographic system rather than a theoretical weakness in the cryptographic algorithm itself. For example, in side-channel attacks, timing information, electromagnetic emissions, power usage, or other side-channel information is used to try and determine a secret value utilized by the cryptographic unit during calculations.

Fault injection techniques may also be used by an interloper to try and determine secret information. In an attack of this nature, the interloper introduces errors into the data or arithmetic operations performed by the cryptographic unit by some means in hope that the erroneous results might reveal secret information or cause the device to perform incorrectly or not as designed. For example, an interloper may apply attacking stimuli such as incorrect clocking, incorrect power supply, or external energy sources (e.g. pulsed lasers or electromagnetic fields), and then monitor the output of the result and/or of the side-channels in the hopes of obtaining information that can be used to determine secret information.

One of the basic arithmetic operations performed in many types of cryptographic systems is a k-fold group operation referred to as exponentiation. Exponentiation is used in an RSA based cryptographic system to encrypt and decrypt messages and to sign and verify messages. The Chinese Remainder Theorem (CRT) is a basic algorithm used to perform exponentiation, and it is well known that this algorithm can be particularly vulnerable to attacks such as those described above.

In a typical RSA based cryptographic system, a correspondent A, which forms part of the cryptographic system, uses its cryptographic unit to sign messages that are verified by a correspondent B in the cryptographic system. The RSA parameters for such a scheme are represented as bit strings and typically consist of the values n=pq, d, and e, where:

p and q are secret prime numbers generated by correspondent A;

e is a positive integer chosen such that gcd(e, $\phi$)=1, where $\phi$=(p−1)(q−1); and d is a number used as a private key and is selected such that ed≡1 (mod $\phi$).

Correspondent A uses private key d for signing a message m, and (n, e) is the corresponding public information used by correspondent B to validate the signature. Correspondent A may then create a signature s by calculating s=$m^d$ mod n. The recipient, correspondent B, may then verify the signature by computing $s^e$ mod n and checking that this computed value corresponds to a message in the message space.

As is well known in the art, the CRT may be used by correspondent A to calculate the signature s more efficiently. In the context of an RSA system, the CRT states that given a value $a_1$ calculated by a mod p operation, and given a value $a_2$ calculated by a mod q operation, there exists a unique solution x modulo n=pq such that x≡$a_1$ (mod p) and x≡$a_2$ (mod q). A well-known method for solving x is to use Garner's algorithm, which is described in "Handbook of Applied Cryptography," Menezes et al., CRC Press, 1997, pp. 612-613, incorporated herein by reference.

To calculate s=$m^d$ mod n by employing the CRT, correspondent A first calculates signature components $s_p$=$m^d$ mod p and $s_q$=$m^d$ mod q, and then combines these values to yield s using Garner's algorithm. By applying Garner's algorithm, the resulting combination may be calculated in the computational unit of correspondent A according to the following formula:

$$s=\text{CRT}(s_p,s_q)=s_{q+[(s_p-s_q)(q^{-1} \bmod p) \bmod p]q}(\bmod n) \quad (1)$$

Additionally, it is a well-known mathematical fact that $m^d$ mod p=$m_p^{d_p}$ mod p where $m_p$=m mod p and $d_p$=d mod(p−1), and similarly $m^d$ mod q=$m_q^{d_q}$ mod q where $m_q$=m mod q and $d_q$=d mod(q−1). Therefore, when computing RSA signatures using the CRT, correspondent A need not store private key d, but instead may store values p, q, $d_p$, $d_q$, and $q^{-1}$ mod p. In this case, when signing a message m, correspondent A uses its cryptographic unit to perform the RSA-CRT computation on the bit strings representing the message m and the RSA parameters. Specifically, the cryptographic unit first calculates message components $m_p$ and $m_q$; next signature components $s_p$=$m_p^{d_p}$ mod p and $s_q$=$m_q^{d_q}$ mod q are calculated; and finally the CRT is used to derive signature s via Garner's algorithm (1) above.

As described in detail in U.S. Pat. No. 7,177,423 to Antipa ("Antipa"), incorporated herein by reference, when computing $s_p$, or $s_q$, correspondent A may be subject to a timing attack by an interloper wishing to determine the secret value p or q and therefore break the system. Therefore, when computing an exponentiation such as $s_p$=$m^d$ mod p or $s_q$=$m^d$ mod q, it is preferable to apply blinding, i.e., to modify the message m by a value unknown to the attacker before exponentiation and then adjust the resulting exponentiated value to retrieve the required value. A variety of blinding techniques are known in the art; however, Antipa advantageously discloses a blinding technique that avoids an inversion operation to recover the correct value after exponentiation. A summary of the blinding technique disclosed in Antipa for computing an exponentiation is as follows. Assume the cryptographic unit of correspondent A is computing the value $s_p$=$m^d$ mod p. First, the cryptographic unit generates a blinding parameter r, which is preferably randomly generated, and then performs exponentiation to calculate $r^e$ mod p, where e is the RSA parameter that comprises one component of the public key. Next, the cryptographic unit combines the message m with $r^e$ mod p to yield $mr^e$ mod p. A small value $\sigma$ is then chosen, and an intermediate value $(mr^e)^{d-\sigma}$ mod p is calculated, where d is the private key. This intermediate value is then multiplied by a value $m^\sigma$ to obtain a blinded value $\tilde{s}_p = r^{1-e\sigma}m^d$ mod p. Finally, the value $\tilde{s}_p r^{1-e\sigma} m^d$ mod p is unblinded by multiplying the value by $r^{e\sigma-1}$ to obtain $s_p = m^d$ mod p.

Conveniently, in the above protocol, the value $\sigma$ can be set to be equal to 1 in order to simplify the calculations. In this case, the blinded value is reduced to $\tilde{s}_p = r^{(1-e)} m^d$ mod p, which can be unblinded by multiplying by $r^{(e-1)}$ to yield $s_p = m^d$ mod p.

Using the Antipa blinding technique, $s_p$ and $s_q$ may be calculated in a way that inhibits p and q from being determined from side-channel attacks, such as timing attacks.

Although blinding the calculation of $s_p$ and $s_q$ enhances protection against timing attacks by an interloper wishing to uncover p and q, it has been shown that a cryptographic system that uses the CRT to compute the value s efficiently is still vulnerable to fault injection attacks. For example, if an interloper can force one of the calculations $s_p$ or $s_q$, say $s_q$, to contain an error, then the signature s will be correct modulo p, but not modulo q. In this case, it has been shown that there is a significant chance that the greatest common denominator of $s^e - m$ and n, is equal to secret value p, i.e. that $\gcd(s^e - m, n) = p$. This may allow the interloper to determine secret information p. Such an attack is referred to as a gcd attack on an RSA-CRT implementation.

It is desired to obviate or mitigate at least one of the disadvantages described above.

BRIEF DESCRIPTION

Exemplary embodiments will now be described by way of example only with reference to the accompanying drawings, in which.

DETAILED DESCRIPTION

Figure 1:
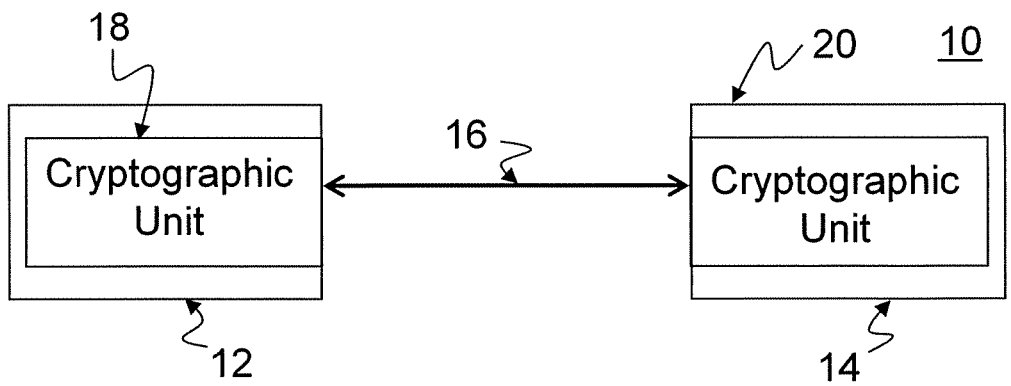
FIG. 1 is a schematic representation of a cryptographic communication system.

In general, it has been recognized that blinding can be maintained during the application of the CRT algorithm and then removed subsequent to the completion of the CRT algorithm. It has been further recognized that fault injection attacks, such as the gcd attack, can be inhibited by applying and retaining blinding during the application of the CRT algorithm to yield a blinded exponentiation value, and then subsequently removing the blinding in a manner that causes an error injected into the CRT computation to cascade into the exponent of the value used to unblind the blinded exponentiated value. It has further been recognized that protection against side-channel attacks during the CRT computation may be enhanced by splitting one or more secret values used in the CRT computation into a plurality of constituent values, and/or by multiplicatively randomizing the secret moduli.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Turning therefore to FIG. 1, a cryptographic communication system is generally denoted by numeral 10. The system 10 has a first correspondent 12 and a second correspondent 14, which are typically computing devices such as a client/server, a pair of computers, or a pair of mobile devices, who communicate with each other over a communication channel 16. The correspondents 12 and 14 are communicating apparatuses having sufficient computational capability to perform the operations required to implement cryptographic algorithms with a key size sufficient to withstand brute force attacks. They are configured to communicate securely over communication channel 16 through the use of cryptographic protocols. For the purpose of illustration, it will be assumed that the correspondents 12 and 14 use a protocol based on the RSA system. It will be understood, however, that the techniques described herein are applicable to other protocols in which exponentiation is utilized, for example, in other schemes based on the integer factorization problem.

Figure 2:
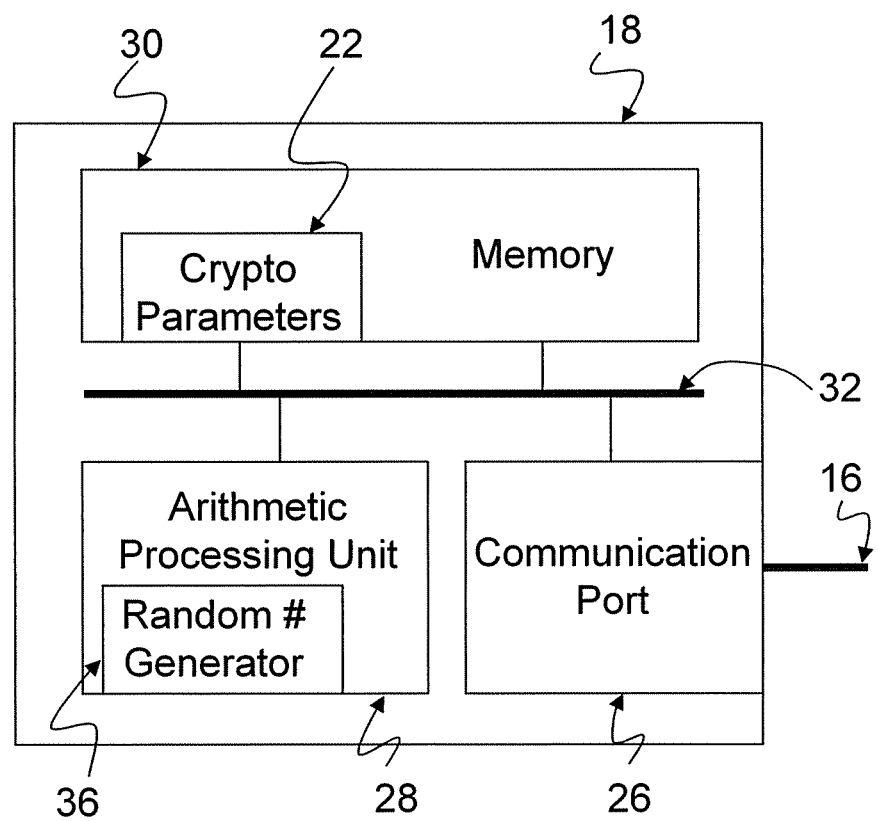
FIG. 2 is a schematic representation of a cryptographic unit used in the cryptographic communication system of FIG. 1.

Each correspondent 12 and 14 has a cryptographic unit 18 and 20 respectively to implement cryptographic algorithms and associated arithmetic operations in a secure manner. The cryptographic unit 18 of correspondent 12 is shown in greater detail in FIG. 2, it being understood that the cryptographic unit 20 of correspondent 14 will have similar functionality. Cryptographic unit 18 comprises a communication port 26 for communicating with correspondent 14 over communication channel 16, and an arithmetic processing unit 28 for performing RSA cryptographic operations. The arithmetic processing unit 28 may include hardware, computer readable software instructions, or a combination of both that is configured to perform cryptographic operations such as those described in detail below. Associated with arithmetic processing unit 28 is a random number generator 36 for generating random values for use in blinding, as will also be described in detail below. The cryptographic unit 18 further includes a memory 30 for storing the results of cryptographic operations performed by processing unit 28, as well as for storing information received via port 26. The memory 30 may be a dedicated memory or a secure partition of the memory associated with the correspondent 12. Cryptographic parameters 22 for performing RSA cryptographic operations are also stored in memory 30. The specific parameters 22 will vary depending on the protocol and/or implementation. However, for the embodiments described below, it will be assumed that cryptographic unit 18 performs exponentiation by implementing an RSA-CRT algorithm, and that to achieve this, secret values p, q, $d_p=d \bmod(p-1)$, $d_q=d \bmod(q-1)$, and $q^{-1} \bmod p$ are retained in memory 30. Internal buses 32 are used by cryptographic unit 18 for communicating information internally.

It will be appreciated that cryptographic unit 20 of correspondent 14, which is not shown in detail in the figures, has a similar internal structure. Cryptographic unit 20 performs RSA cryptographic operations using its arithmetic processing unit and retains public values n and e in its memory, which correspond with the parameters 22 stored by correspondent 12 in memory 30. Both cryptographic units 18 and 20 are secure to ensure values used in the computations, as well as the partition of memory 30 used to store the system parameters, are not directly accessible either by physical inspection or by interrogation by a computing device.

During operation, correspondent 12 may wish to perform an exponentiation of a message m using the RSA-CRT algorithm. For example, the message m may be encrypted information sent from correspondent 14, and therefore, correspondent 12 may wish to decrypt the message m by exponentiating the message m by his private key to obtain an exponentiated message representing the decrypted information. Alternatively, the message m may be information that the correspondent wishes to sign by exponentiating the message m by his private key to obtain an exponentiated message representing the signature s of the message m. To simplify the description of the following embodiments, it will be assumed that correspondent 12 wishes to generate a signature s for a message m and uses an RSA-CRT algorithm to perform the exponentiation. However, it will be appreciated that the embodiments described below can be generalized to any exponentiation where a secret exponent is to be used, including, for example, decrypting an encrypted message.

Figure 3:
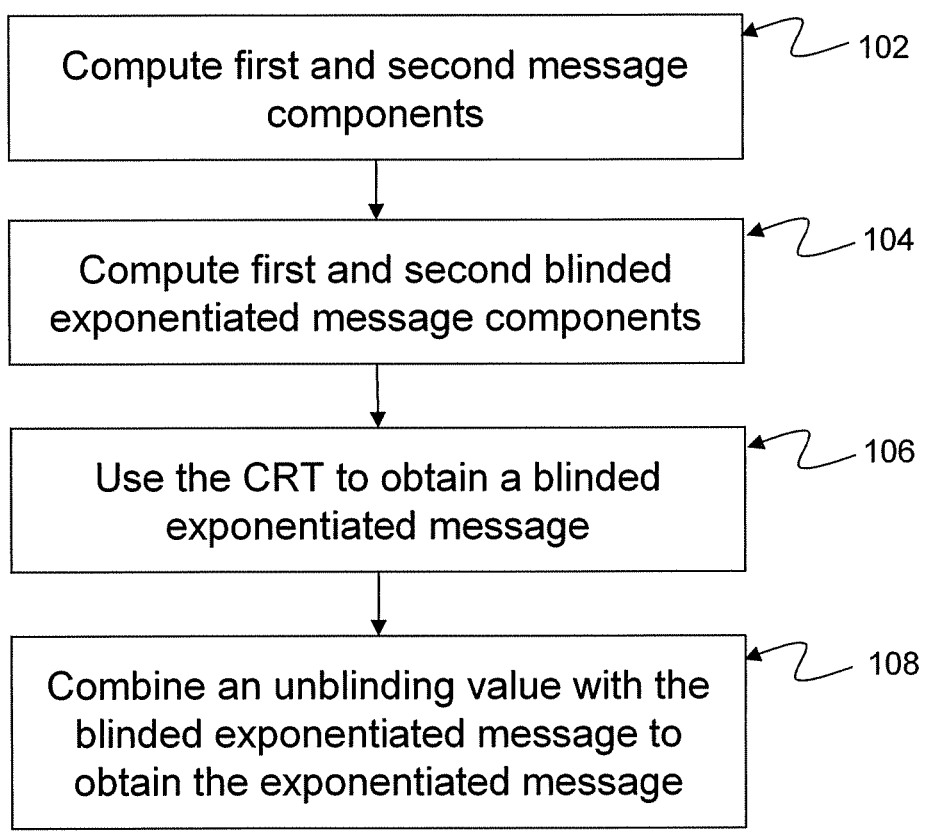
FIG. 3 is a schematic of an embodiment of a method of exponentiating a message.

Turning therefore to FIG. 3, an embodiment of a method is shown for computing an exponentiation of the message m. In step 102, the correspondent 12 performs modular arithmetic operations in its processing unit 28 to generate a first message component and a second message component. The first message component is computed by operating on the message m using a mod p operation, and the second message component is computed by operating on the message m using a mod q operation. Next, in step 104, the processing unit 28 computes a first blinded exponentiated message component using the first message component, a value derived from a blinding parameter, and the private key information. The processing unit 28 also computes a second blinded exponentiated message component using the second message component, another value derived from the blinding parameter, and the private key information. It will be appreciated that the two values derived from the blinding parameter may be the same value and may be the blinding parameter itself.

Then, in step 106, the processing unit 28 combines the first blinded exponentiated message component and the second blinded exponentiated message component using a Chinese Remainder Theorem (CRT) algorithm to obtain a blinded exponentiated message. Finally, in step 108, the processing unit 28 combines the unblinding value with the blinded exponentiated message to obtain the exponentiated message.

Specific embodiments in the context of an RSA system are described below.

Figure 4:
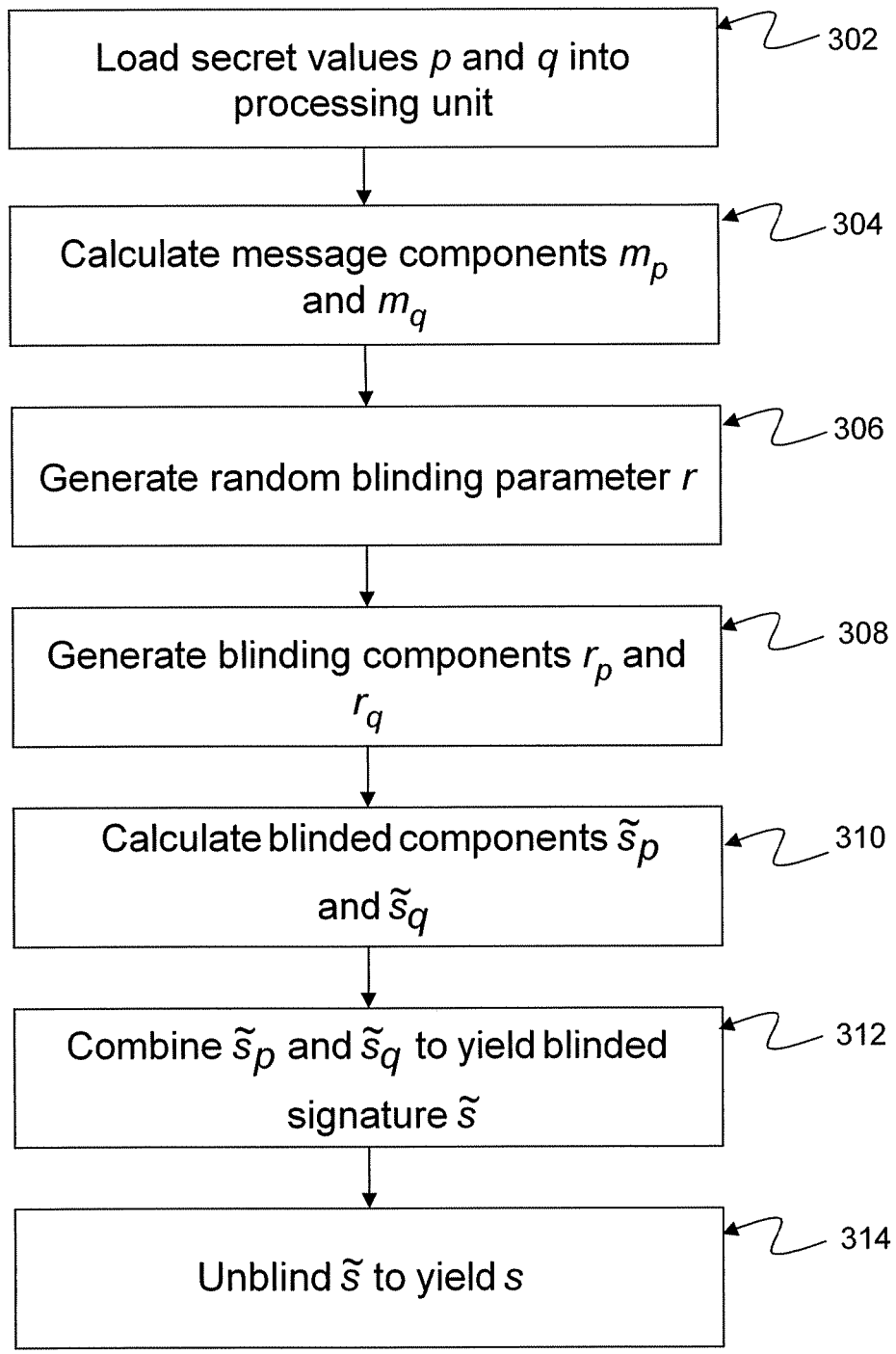
FIG. 4 is a schematic of an embodiment of a method of generating a signature using the RSA-CRT algorithm with blinding to generate a blinded signature, and then subsequently unblinding the signature.

Turning next to FIG. 4, an embodiment of a method will now be described in which cryptographic unit 18 of correspondent 12 generates a signature s using the RSA-CRT algorithm by: (a) applying blinding to the calculation of each signature component $s_p$ and $s_q$ to obtain blinded signature components $\tilde{s}_p$ and $\tilde{s}_q$; (b) combining the blinded signature components $\tilde{s}_p$ and $\tilde{s}_q$, using Garner's algorithm' (1) to yield a blinded signature values $\tilde{s}$; and (c) unblinding the blinded signatures $\tilde{s}$ to yield signature s.

Correspondent 12 generates a message m, which it wishes to sign by creating a signature s and then subsequently send this signature and the message m to correspondent 14. Therefore, in step 302, first the correspondent 12 instructs the cryptographic unit 18 to retrieve from memory 30 via bus 32 secret values p and q and load these values into arithmetic processing unit 28 along with message m. In step 304, processing unit 28 then performs modular arithmetic operations to generate bit strings representing message components $m_p$ and $m_q$ with respect to the moduli p and q so that: $m_p=m \bmod p$ and $m_q=m \bmod q$. The Antipa blinding scheme described earlier with parameter σ=1 is used to perform blinding. Therefore, in step 306, random number generator 36 generates random blinding parameter r. In step 308, the arithmetic unit 28 then performs modular arithmetic operations on the bit string r to obtain blinding components $r_p$ and $r_q$ where $r_p=r \bmod p$ and $r_q=r \bmod q$. The values e, $d_p$, and $d_q$ are next retrieved from memory 30 via bus 32, and in step 310 the arithmetic processing unit 28 performs the arithmetic operations to calculate: 1) a blinded signature component $\tilde{s}_p$ corresponding to $s_p=m_p{}^{s_p} \bmod p$; and 2) a blinded signature component $\tilde{s}_q$ corresponding to $s_q=m_q{}^{d_q} \bmod q$. Using the Antipa blinding scheme $\tilde{s}_p=r_p{}^{(1-e)}m_p{}^{d_p} \bmod p$ and $\tilde{s}_q=r_q{}^{(1-e)}m_q{}^{d_q} \bmod q$ are calculated in the arithmetic processing unit 28. Once the blinded signature components $\tilde{s}_p$ and $\tilde{s}_q$ are calculated, in step 312, processing unit 28 then combines these blinded signature components utilizing Garner's formula (1) to yield a blinded signature $\tilde{s}$ corresponding to the signature $\tilde{s}$:

$$\tilde{s}=\mathrm{CRT}(\tilde{s}_p,\tilde{s}_q)=\tilde{s}_q+[(\tilde{s}_p-\tilde{s}_q)(q^{-1} \bmod p) \bmod p]q \\ (\bmod n).$$

In this way, the blinding applied in the calculation of $\tilde{s}_p$ and $\tilde{s}_q$ is retained during the combination of $\tilde{s}_p$ and $\tilde{s}_q$ in the RSA-CRT algorithm, which results in a blinded signature $\tilde{s}=r^{(1-e)}m^d \pmod n$. The cryptographic unit 18 subsequently unblinds signatures $\tilde{s}$ to yield s. This can be achieved, in step 314, by multiplying $\tilde{s}$ by $r^{e-1}$ to yield s.

As discussed earlier, an interloper may use fault injection techniques to try and force one of the calculations, $s_p$ or $s_q$, to contain an error and thereby output a compromised or unexpected value s that may be used to yield secret value p or q. Although the correspondent 12 may perform an explicit validation to check whether or not the computed signature s equals its expected value, a sophisticated interloper can prevent such a step or exploit the compromised value s before correspondent 12 realizes that s has been compromised. Therefore, the embodiment described in FIG. 4 can be modified such that in step 314 the cryptographic unit 18 implements an unblinding operation that causes errors that are injected into the calculation of either $s_p$ or $s_q$ to be cascaded into the value used to remove the blinding, thereby providing confidence that the signature, if tampered with, will be incorrect both modulo p and modulo q, thus inhibiting the effectiveness of the gcd attack.

Figure 5:
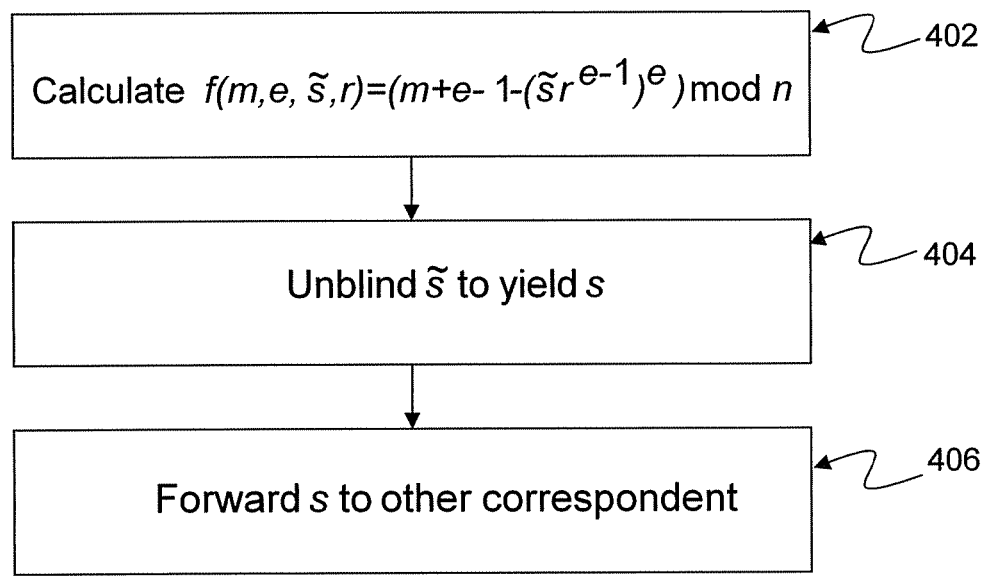
FIG. 5 is a schematic of one embodiment of a method of unblinding a blinded signature.

Turning therefore to FIG. 5, an embodiment of a method of unblinding the blinded signature $\tilde{s}$ generated during step 312 of the method of FIG. 4 will now be described. In step 402, cryptographic unit 18 uses the blinded signatures $\tilde{s}$ as an input to a function $f(\tilde{s})$ that will yield a predetermined or known value if $\tilde{s}$ is equal to its expected value. In this embodiment, the function is set as $f(\tilde{s})=f(m,e,\tilde{s},r)=(m+e-1-(\tilde{s}r^{e-1})^e) \bmod n$, which will yield known value e−1 if $\tilde{s}$ is equal to its expected value, since $m=(\tilde{s}r^{e-1})^e \bmod n$ if $\tilde{s}=r^{(1-e)}m^d \bmod n$. Conveniently, in this embodiment, during the computation of $f(m,e,\tilde{s},r)$, processing unit 28 computes the intermediate value $r^{e-1} \bmod n$ using the CRT algorithm. Also, the values $r_p^{e-1} \bmod p$ and $r_q^{e-1} \bmod q$ calculated during the CRT algorithm are conveniently previously computed in the course of blinding in step 310 above.

Next, in step 404, the arithmetic processing unit 28 of the cryptographic unit 18 then unblinds the blinded signatures $\tilde{s}$ by multiplying $\tilde{s}$ by an unblinding value $r^{f(m,e,\tilde{s},r)}$ modulo n, where $f(m,e,\tilde{s},r)$ is the function above, which yields e−1 if $\tilde{s}$ equals its expected value of $\tilde{s}=r^{(1-e)}m^d \bmod n$. To achieve this, processing unit 28 performs modular arithmetic operations to calculate $s=\tilde{s}r^{f(m,e,\tilde{s},r)} \bmod n$. In step 406, the unblinded signature s is then sent to correspondent 14 along with message m.

Advantageously, by unblinding the signature $\tilde{s}$ as shown in step 404 above, any error injected into the computation of or $\tilde{s}_p$ or $\tilde{s}_q$ by an interloper will cascade into the exponent $f(m,e,\tilde{s},r)$ of the value $r^{f(m,e,\tilde{s},r)} \bmod n$ used to unblind $\tilde{s}$. This will cause the unblinded signature s to be incorrect both modulo p and modulo q, which inhibits the effectiveness of a gcd attack, since a gcd attack relies upon the (compromised) signature output being correct either modulo p or modulo q.

In an alternative embodiment, it is contemplated that prior to step 404, the cryptographic unit 18 compares the output of $f(m,e,\tilde{s},r)$ to e−1. If $f(m,e,\tilde{s},r)=e-1$ then the signature $\tilde{s}$ is validated and the unblinding process continues. However, if an error is injected into the calculation of $\tilde{s}$ by an interloper, then $f(m,e,\tilde{s},r) \neq e-1$, and validation therefore fails and cryptographic unit 18 notifies correspondent 12 that the signature $\tilde{s}$ calculated is not equal to its expected value. However, as mentioned above, it may be the case that the interloper is able to prevent such an explicit validation step. In such a case, the gcd attack on the signature is still inhibited as any error injected into the computation of $\tilde{s}_p$ or $\tilde{s}_q$ by an interloper will cascade into the exponent $f(m,e,\tilde{s},r)$ of the value $r^{f(m,e,\tilde{s},r)} \bmod n$ used to unblind $\tilde{s}$.

In a variant of the embodiment described in FIG. 5, the exponent $f(m,e,\tilde{s},r)$ is truncated if there is a concern that the computation of $f(m,e,\tilde{s},r)$ by processing unit 28 may yield a long and/or very different sequence when $f(m,e,\tilde{s},r)$ does not equal its expected value. For example, $f(m,e,\tilde{s},r)$ can be set as $f(m,e,\tilde{s},r)=\text{trunc}((m+e-1-(\tilde{s}r^{e-1})^e) \bmod n)$, where trunc( ) is a truncation function that truncates the bit length to be no less than the bit length of e−1.

Additionally, if there is a concern that when $f(m,e,\tilde{s},r)$ does not equal its expected value $r^{f(m,e,\tilde{s},r)} \bmod n$ may be distinguishable from the exponentiation $r^{e-1} \bmod n$, or if there is a concern that an attacker may be able to directly set the outcome of the truncation function to e−1, the random number generator 36 can be configured to generate random blinding value r having the form $r=t^\alpha \bmod n$, where t and $\alpha$ are random values. In this case, $\alpha$ is preferably small (e.g. 32 bits). It will be appreciated that other similar rearrangements employing a randomized exponent and/or base to produce r are possible. Additionally, in such rearrangements, it is possible to utilize the trunc( ) function. For example, trunc( ) may be appropriately resized and applied after incorporating $\alpha$ in $f(m,e,\tilde{s},r)$, such that it results in $\alpha(e-1)$ when calculating unblinding multiplier $t^{f(m,e,\tilde{s},r)} \bmod n$, since $\alpha$ is not known to the attacker and may be changed for every signature. For example, $f(m,e,\tilde{s},r)$ can be set as $f(m,e,\tilde{s},r)=\text{trunc}((m+\alpha(e-1)-(\tilde{s}r^{e-1})^e) \bmod n)$.

In the embodiment described in FIG. 5, the blinded signatures $\tilde{s}$ is unblinded during the computation of $f(m,e,\tilde{s},r)$ itself. This is because calculating the function $f(m,e,\tilde{s},r)=(m+e-1-(\tilde{s}r^{e-1})^e) \bmod n$ includes the intermediate calculation $\tilde{s}r^{e-1} \bmod n$, which corresponds to unblinded value s. Therefore, an interloper may try and induce the processing unit 28 to output the intermediate value $\tilde{s}r^{e-1} \bmod n = s$ during the calculation of $f(m,e,\tilde{s},r)$. If the interloper is successful, the interloper may use this intermediate value in a gcd attack to try and determine secret information. Therefore, FIG. 6 discloses an alternative embodiment of the unblinding method of FIG. 5 in which blinded signatures $\tilde{s}$ remains blinded during the computation of $f(m,e,\tilde{s},r)$.

In step 502, cryptographic unit 18 uses the blinded signatures $\tilde{s}$ as an input to a function $f(\tilde{s})$ that will yield a predetermined or known value if $\tilde{s}$ is equal to its expected value. In this embodiment, the function is set as $f(\tilde{s})=f(m,e,\tilde{s},r)=(mr^e+e-1-(\tilde{s}r^e)^e) \bmod n$, which will yield known value e−1 if $\tilde{s}$ is equal to its expected value, since $(\tilde{s}r^e)^e \equiv mr^e (\bmod n)$ if $\tilde{s}=r^{(1-e)}m^d \bmod n$. This function does not include a computation corresponding to the unblinded value of the signature s.

Next, in step 504, the arithmetic processing unit 28 of the cryptographic unit 18 unblinds blinded signature $\tilde{s}$ by multiplying $\tilde{s}$ by $r^{f(m,e,\tilde{s},r)}$, where $f(m,e,\tilde{s},r)$ is the function calculated above, which yields e−1 if $\tilde{s}$ equals its expected value of $\tilde{s}=r^{(1-e)}m^d \bmod n$. To achieve this, processing unit 28 performs modular arithmetic operations to calculate $s=\tilde{s}r^{f(m,e,\tilde{s},r)} \bmod n$. In step 506, the unblinded signature s is then sent to correspondent 14 along with message m.

Figure 6:
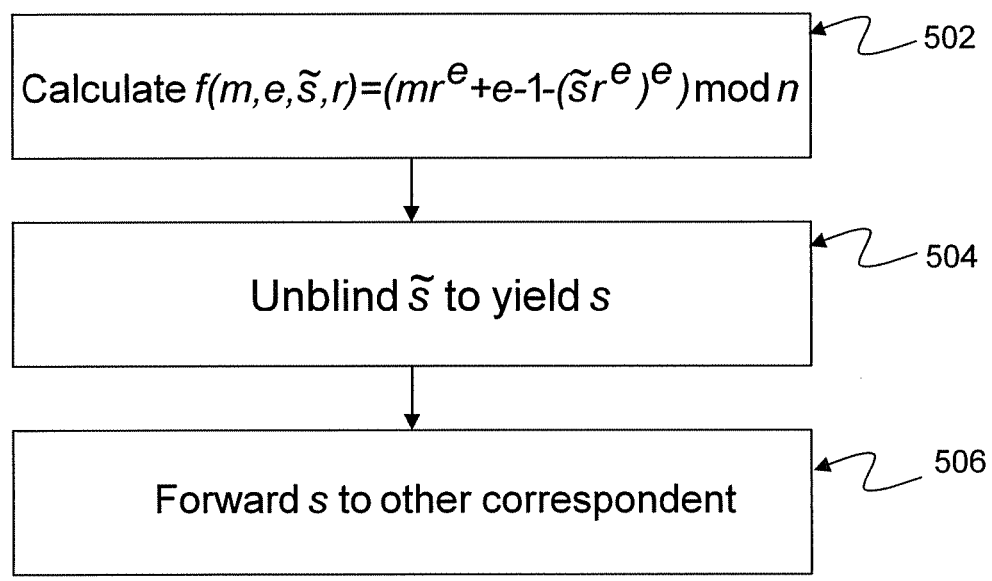
FIG. 6 is a schematic of another embodiment of a method of unblinding a blinded signature.

Advantageously, in the embodiment shown in FIG. 6, there is no unblinding during the calculation of $f(m,e,\tilde{s},r)$, rather unblinding only occurs in step 504.

As discussed with reference to the embodiment of FIG. 5, a truncation function may be utilized in the calculation of $f(m,e,\tilde{s},r)$ (e.g. $f(m,e,\tilde{s},r)=\text{trunc}((mr^e+e-1-(\tilde{s}r^e)^e) \bmod n)$), and random blinding value r may have the form $r=t^\alpha \bmod n$, where $\alpha$ is incorporated in $f(m,e,\tilde{s},r)$ such that it results in $\alpha(e-1)$ when calculating unblinding multiplier $t^{f(m,e,\tilde{s},r)} \bmod n$ (e.g. $f(m,e,\tilde{s},r)=\text{trunc}((mr^e+\alpha(e-1)-(\tilde{s}^e)^e) \bmod n)$).

Also, as discussed with reference to the embodiment of FIG. 5, by unblinding the signature $\tilde{s}$ as shown in step 504 above, any error injected into the computation of $\tilde{s}_p$ or $\tilde{s}_q$ by an interloper will cascade into the exponent $f(m,e,\tilde{s},r)$ of the value $r^{f(m,e,\tilde{s},r)} \bmod n$ used to unblind $\tilde{s}$. This will cause the unblinded signature s to be incorrect both modulo p and modulo q, which inhibits the effectiveness of a gcd attack.

In an alternative embodiment, it is contemplated that prior to step 504, the cryptographic unit 18 compares the output of $f(m,e,\tilde{s},r)$ to e−1. If $f(m,e,\tilde{s},r)=e-1$ then the signatures $\tilde{s}$ is validated and the unblinding process continues. However, if an error is injected into the calculation of $\tilde{s}$ by an interloper, then $f(m,e,\tilde{s},r) \neq e-1$, and validation therefore fails and cryptographic unit 18 notifies correspondent 12 that the signature $\tilde{s}$ calculated is not equal to its expected value. However, as mentioned above, it may be the case that the interloper is able to prevent an explicit validation step. In such a case, the gcd attack on the signature is still inhibited as any error injected into the computation of $\tilde{s}_p$ or $\tilde{s}_q$ by an interloper will cascade into the exponent $f(m,e,\tilde{s},r)$ of the value $r^{f(m,e,\tilde{s},r)}$ mod n used to unblind $\tilde{s}$.

To further enhance protection against side channel attacks during RSA-CRT computations in the embodiments described above, it is possible to introduce randomness into the parameters used in the computations and thereby further conceal the secret values. This may be done in a number of ways. For example, the cryptographic unit 18 may use some or all of the secret values p, q, $d_p$, $d_q$, and $q^-$mod p in split form, i.e., composed of randomized pieces. For example, the secret values can be split as follows:

$$d_p = d_{p1} + d_{p2},\ d_q = d_{q1} + d_{q2},$$

$$p = p_{plus} - p_{minus},\ q = q_{plus} - q_{minus},\ \text{and}$$

$$(q^{-1}\bmod p) = q\mathrm{Inv}_{plus} - q\mathrm{Inv}_{minus},$$

where the split values $d_{p1}$, $d_{p2}$, $d_{q1}$, $d_{q2}$, $p_{plus}$, $p_{minus}$, $q_{plus}$, $q_{minus}$, $q\mathrm{Inv}_{plus}$, and $q\mathrm{Inv}_{minus}$ are randomly generated and stored in memory 30 by correspondent 12.

In the embodiment above, the values $d_p$ and $d_q$ have been split via addition, and the values p, q, and $q^{-1}$ mod p have been split via subtraction. It will be appreciated that such a decomposition is arbitrary and that therefore other decompositions are possible. It will also be appreciated that the multiplicity of the splitting, i.e., the number of constituent components in each split, may be more than two. In any case, it is preferred that the splits are updated regularly, preferably after each signature via the addition or subtraction of random components. For example, secret value $d_p$ can be generated as $d_p = (d_{p1} + \delta) + (d_{p2} - \delta)$, where = is a random number generated by random number generator 36 subsequent to each signature. Alternatively, a random value $d_{p1}$ may be generated by random number generator 36 subsequent to each signature, and then a corresponding value $d_{p2}$, chosen such that $d_p = d_{p1} + d_{p2}$. The other split secret values can be generated in a similar manner.

Alternatively, some of the secret values may be split modularly (e.g. $d_p = d_{p1} + d_{p2} \bmod(p-1)$), but this may not be advantageous if the secret modulus p−1 is needed in the combination or in further usage of the split components, since employing the secret modulus p−1 may leak information in a side channel. It is also contemplated that the split values may be signed values.

The split exponents $d_p$, and $d_q$ can be further randomized by cryptographic unit 18 using randomly chosen multiples of p−1 and q−1:

$$d_p' = ((d_{p1} + \rho_p(p_{plus} - 1)) + d_{p2}) - \rho_p p_{minus} = d_p - \rho_p(p-1),$$

and $$d_q' = ((d_{q1} + \rho_q(q_{plus} - 1)) + d_{q2}) - \rho_q q_{minus} = d_q - \rho_q(q-1),$$

where values $\rho_p$ and $\rho_q$ are generated by random number generator 36 and have sizes that balance security against side-channel attacks, extra time spent in the exponentiation, and available storage. For example, $\rho_p$ and $\rho_q$ can be 32, 64, or 128 bits each, or possibly more. Additionally, in some embodiments, the order in which the split values are composed in the calculation is important. In these embodiments, it is desired to avoid producing the original secret value by combining the split terms at an intermediate step in the computation.

Regardless of how the secret values are split, these split values are then used in place of the corresponding unsplit values in the CRT algorithm (e.g., in place of the corresponding unsplit values in the calculation of Garner's algorithm (1)).

In addition to splitting the secret values as described above, in yet a further alternative embodiment, the moduli p and q can be multiplicatively randomized in order to further strengthen the RSA-CRT computations against side-channel attacks. In such an embodiment, random number generator 36 generates random values $a_1$ and $a_2$, and then arithmetic processing unit 28 uses these values to randomize moduli p and q by calculating: $p^* = a_1 p$ and $q^* = a_2 q$. New values $a_1$ and $a_2$ are preferably generated for each signature. mod $p^*$ and mod $q^*$ operations are then performed during the RSA-CRT computations in the embodiments described above instead of mod p and mod q.

It will be appreciated that in some embodiments that employ multiplicatively randomized moduli, odd moduli are required, and therefore in such embodiments the random number generator 36 will generate odd random numbers $a_1$ and $a_2$. Furthermore, it will be appreciated that the length of random numbers $a_1$ and $a_2$ should be suitable for the arithmetic processing unit 28 and should be a balance between side-channel protection and the additional cost of using longer moduli. For example, $a_1$ and $a_2$ can be 32, 64, or 128 bits each, or possibly more.

If the splitting of secret values discussed above is also utilized, the multiplicatively randomized secret moduli can be generated by multiplying each split value by the random value, for example:

$$p^* = a_1 p_{plus} - a_1 p_{minus} = a_1 p,\ \text{and}$$

$$q^* = a_2 q_{plus} - a_2 q_{minus} = a_2 q,$$

assuming a splitting into two values.

Conveniently, when choosing $a_1$ and $a_2$, it is not necessary to consider the co-primality of $a_1$ and $a_2$, or to calculate their totients. This is due to the fact that a value v is congruent to $v_p = v$ mod p, even if it is first reduced modulo $p^*$. An outline of the proof of this fact is as follows. Let $v_p = v$ mod $p = v - k_1 p$ and $v_{p^*} = v$ mod $p^* = v - k_2 p^*$ where $k_1$ and $k_2$ are integers, $v_p < p$, and $v_p < p^*$. Reducing $v_{p^*}$ modulo p yields $v_{p^*} = v_{p^*} - k_3 p = v - k_2 p^* - k_3 p = v - k_4 p$ where $k_3$ is an integer, $k_4 = k_2 r_1 + k_3$, and $v_{p^*}$ mod $p < p$. Hence, by the division algorithm, $v_{p^*}$ mod $p = v_p$. Therefore:

$$v_{p^*} \equiv (\bmod p),\ \text{where } v_{p^*} = v \bmod p^* \text{ and } v_p = v \bmod p. \quad (2)$$

Using (2), therefore:

$$s_{p^*} \equiv s_p (\bmod p),\ \text{where } s_{p^*} = m_{p^*}{}^{d_p} \bmod p^* \text{ and } s_p = m_p{}^{d_p} \bmod p;\ \text{and}$$

$$s_{q^*} \equiv s_q (\bmod q),\ \text{where } s_{q^*} = m_{q^*}{}^{d_p} \bmod q^* \text{ and } s_q = m_q{}^{d_q} \bmod q.$$

In view of this, when utilizing multiplicatively randomized moduli, the signature s is not calculated using Garner's algorithm (1), but is instead calculated using a Garner-like form similar to (1), namely:

$$s = s_{q^*} + [(s_{p^*} - s_{q^*})(q^{-1} \bmod p) \bmod p^*] q (\bmod n). \quad (3)$$

Using formulas (2) and (3), it is straight-forward to show that $s \equiv s_{p^*} \equiv s_p \pmod{p}$ and $s \equiv s_{q^*} \equiv s_q \pmod{q}$. Since s is correct modulo both p and q, then computing (3) is equivalent to computing $s = m^d$ mod n.

In view of the above, and turning to FIG. 7, an embodiment of a method of generating a signature $s = m^d$ mod n using the RSA-CRT algorithm will now be described in which: (a) a blinded signatures $\tilde{s}$ is generated using the CRT algorithm as in FIG. 4; (b) the blinded signatures $\tilde{s}$ is unblinded using the method described in FIG. 6; (c) split versions of the secret values are utilized; and (d) randomized moduli p* and q* are utilized.

Correspondent 12 generates a message m, which it wishes to sign by creating a signature s and then subsequently send to correspondent 14. Therefore, in step 602, first the correspondent 12 instructs the cryptographic unit 18 to obtain the secret values $p_{plus}$, $p_{minus}$, $q_{plus}$, and $q_{minus}$, and load these values into arithmetic processing unit 28 along with message m. Next, in step 604, random number generator 36 then generates random values $a_1$ and $a_2$. Then, in step 606, arithmetic processing unit 28 performs modular arithmetic operations to calculate blinded moduli $p^*=a_1 p_{plus}-a_1 p_{minus}$ and $q^*=a_2 q_{plus}-a_2 q_{minus}$. In step 608, processing unit 28 then calculates message components $m_{p*}$ and $m_{q*}$, with respect to the blinded moduli p* and q* so that: $m_{p*}=m \bmod p^*$ and $m_{q*}=m \bmod q^*$.

The Antipa blinding scheme with parameter σ=1 is used to perform blinding. Therefore, in step 610, the random number generator 36 generates random blinding parameter r. In step 612, processing unit 28 then performs modular arithmetic operations on the bit string r to obtain blinding components $r_{p*}$, and $r_{q*}$ where $r_{p*}=r \bmod p^*$ and $r_{q*}=r \bmod q^*$. In step 614, the values e, $d_p'$, and $d_q'$ are next retrieved from memory 30 via bus 32, and processing unit 28 performs modular arithmetic operations to calculate the randomized blinded pre-signature components:

$$\tilde{s}_{p*}=((r_{p*}{}^e m_{p*})^{(d_q'-1)} m_{p*}) \bmod p^*; \text{ and}$$

$$\tilde{s}_{q*}=((r_{q*}{}^e m_{q*})^{(d_q'-1)} m_{q*}) \bmod q^*.$$

It will be appreciated that $\tilde{s}_{p*} \equiv \tilde{s}_p (\bmod p)$ and $\tilde{s}_{q*} \equiv \tilde{s}_q (\bmod q)$ due to (2).

Next, in step 616, blinded value $\tilde{s}=\tilde{s}_{q*}+[(\tilde{s}_{p*}-\tilde{s}_{q*})(q^{-1} \bmod p) \bmod p^*]q (\bmod n)$ is then calculated by processing unit 28 using the split values so that calculations involving p and q directly are avoided. Processing unit 28 therefore first performs modular arithmetic operations to calculate $a=(\tilde{s}_{p*}-\tilde{s}_{q*}) \bmod p^*$, and then $b=(aq_{Inv_{plus}}-aq_{Inv_{minus}}) \bmod p^*$; and then $\tilde{s}=(bq_{plus}+\tilde{s}_{q*}-bq_{minus}) \bmod n$. It will be noted that $\tilde{s} \equiv \tilde{s}_p (\bmod p)$, $\tilde{s} \equiv \tilde{s}_q (\bmod q)$, and therefore $\tilde{s} \equiv m^d r^{1-e} (\bmod n)$. That is, the blinded signature value $\tilde{s}$ calculated in this embodiment is congruent to the blinded signature value calculated in the embodiment of FIG. 5, which does not employ multiplicatively randomized secret moduli.

In step 618, the blinded signatures $\tilde{s}$ is then unblinded by cryptographic unit 18 as described earlier, for example in the FIG. 6 embodiment. In step 620 correspondent 12 then sends the unblinded signature s to correspondent 14 along with message m.

In summary, as shown in the embodiments of FIGS. 5 and 6, maintaining the blinding during the RSA-CRT algorithm to yield a blinded signature value $\tilde{s}$, and then subsequently unblinding $\tilde{s}$ using an unblinding operation that causes errors that are injected into the calculation of either $s_p$ or $s_q$ to be cascaded into the exponent used to remove the blinding inhibits the effectiveness of fault injection attacks such as the gcd attack. In the FIG. 7 embodiment, split secret values and multiplicatively randomized secret moduli are additionally used in the calculations to further enhance protection against side-channel attacks since no computations are ever performed using the secret values and/or secret moduli directly.

Figure 7:
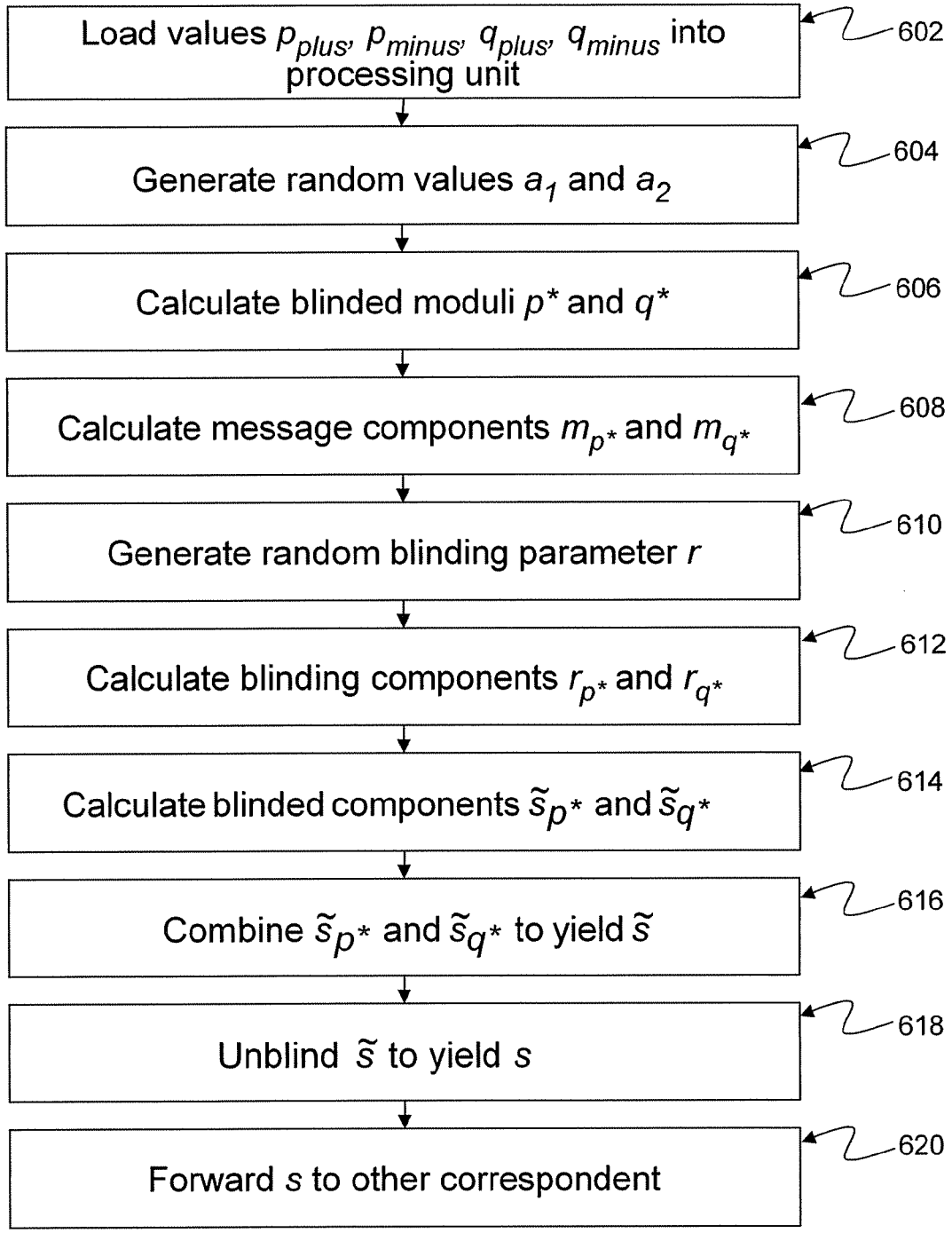
FIG. 7 is a schematic of an embodiment of a method of generating a blinded signature and then subsequently unblinding the blinded signature, wherein split secret values and multiplicatively randomized moduli are utilized.

It will be appreciated that although the embodiment described in FIG. 7 uses both split secret values and multiplicatively randomized secret moduli to further enhance protection against side-channel attacks, in other embodiments only multiplicatively randomized moduli may be utilized (and not split secret values), and vice versa. In fact, as is clear from the embodiments described in FIGS. 5 and 6, neither are necessary to counter attacks such as the gcd attack, since this is achieved by retaining the blinding during the RSA-CRT algorithm to yield blinded signature values $\tilde{s}$ and implementing an unblinding operation that causes errors injected into the calculation of either $s_p$ and $s_q$ to be cascaded into the exponent used to remove the blinding. However, although the use of split secret values and multiplicatively randomized secret moduli, as shown in FIG. 7, is not necessary to inhibit attacks such as the gcd attack, both techniques are useful in further enhancing protection against fault injection attacks that interrupt the computations of processing unit 28 and attempt to cause correspondent 12 to output information that may be used to derive secret values. They are also useful in enhancing protection against safe-error fault attacks, in which a fault is injected in one bit of a constant secret value per execution and the response of the device is observed to determine the value of the faulty bit based on whether the signature was rejected or was correct.

Although the invention has been described with reference to certain specific embodiments, various modifications thereof will be apparent to those skilled in the art without departing from the spirit and scope of the invention as outlined in the claims appended hereto.

For example, in the above-described embodiments, it has been assumed that during the Antipa blinding, the Antipa parameter σ is equal to 1. As described in U.S. Pat. No. 7,177,423 to Antipa ("Antipa"), and as discussed earlier, the parameter σ may in fact be any small integer. It is therefore contemplated that in the above-described embodiments, σ does not have to be equal to 1. In the above-described embodiments, if σ≠1, the unblinding techniques described above may be carried out in the same way, except for replacing e with eσ and m with $m^σ \bmod n$ in the unblinding computations.

Additionally, in the above-described embodiments, the steps where random values are generated and modular arithmetic operations are performed thereupon can be grouped and combined together to be computed before the message to be signed is available in order to speed up the signing procedure once the message arrives.

What is claimed is:

1. A method of computing an exponentiated message of the form $s=m^d \bmod n$, the method being performed by a correspondent in a cryptographic system, wherein the cryptographic system is an RSA system having a private key d and a corresponding public key (n, e) wherein n=pq, gcd(e, φ)=1, and φ=(p−1)(q−1), the correspondent including a processing unit and a memory, the memory having stored thereon a secret value p, a secret value q, and private key information; the method comprising the steps of:

(a) the correspondent performing modular arithmetic operations in said processing unit to generate a first message component and a second message component, the first message component computed by operating on a message m using a mod p operation, and the second message component computed by operating on said message m using a mod q operation;

(b) the processing unit computing a first blinded exponentiated message component using said first message component, a value derived from a blinding parameter r, and said private key information, and the processing unit computing a second blinded exponentiated message component using said second message component, another value derived from said blinding parameter r, and said private key information;

(c) the processing unit combining said first blinded exponentiated message component and said second blinded exponentiated message component using a Chinese Remainder Theorem (CRT) algorithm to obtain a blinded exponentiated message of the form $\tilde{s}=r^{(1-e)} m^d$ mod n;

(d) the processing unit validating the blinded exponentiated message by applying the blinded exponentiated message as an input to a function $f(\tilde{s})$ to obtain an output value of the function $f(\tilde{s})$, the output value equalling a predetermined value if the blinded exponentiated message is equal to an expected value of the blinded exponentiated message; and, (e) the processing unit evaluating the output value and when the output value does not equal the predetermined value, the processing unit notifies the correspondent that the validation has failed, and when the output value does equal the predetermined value, the processing unit:
  (i) combining the output value with the blinding parameter r to obtain the unblinding value $r^{f(\tilde{s})}$; and,
  (ii) unblinding the blinded exponentiated message by multiplying the blinded exponentiated message with the unblinding value to obtain the exponentiated message;
  whereby when the output value does not equal the predetermined value, the unblinding value differs from an expected value resulting in a failed unblinding of the blinded exponentiated message, thereby countering a fault injection attack.

2. The method of claim 1 wherein said predetermined value of said output value of said function is e−1.

3. The method of claim 1, wherein said first message component is of the form $m_p = m$ mod p, said second message component is of the form $m_q = m$ mod q, said blinding parameter r is an Antipa blinding parameter r randomly generated by said correspondent, said first blinded exponentiated message component is of the form $\tilde{s}_p = r^{(1-e)} m_p^{d_p}$ mod p, and said second blinded exponentiated message component is of the form $\tilde{s}_q = r^{(1-e)} m_q^{d_q}$ mod q, wherein $r_p = r$ mod p, $r_q = r$ mod q, $d_p = d$ mod(p−1), and $d_q = d$ mod(q−1).

4. The method of claim 3 wherein said secret value p is multiplicatively randomized using a random value $a_1$ generated by said correspondent, wherein said secret value q is multiplicatively randomized using a random value $a_2$ generated by said correspondent, and wherein said CRT algorithm includes the step of computing said blinded exponentiated message as $\tilde{s}=\tilde{s}_{q*}+[(\tilde{s}_{p*}-\tilde{s}_{q*})(q^{-1} \text{mod } p) \text{mod } p*]q(\text{mod } n)$ wherein p* and q* represent the multiplicatively randomized values of said secret value p and said secret value q respectively.

5. The method of claim 1 wherein said value derived from said blinding parameter and said another value derived from said blinding parameter are the same value.

6. The method of claim 1 wherein said function $f(\tilde{s})$ is of the form $(mr^e + e - 1 - (\tilde{s}r^e)^e)$ mod n.

7. A non-transitory computer-readable medium having stored thereon computer readable instructions for performing a method of computing an exponentiated message of the form $s = m^d$ mod n, the method to be performed by a correspondent in a cryptographic system, wherein the cryptographic system is an RSA system having a private key d and a corresponding public key (n, e) wherein n=pq, gcd(e, φ)=1, and φ=(p−1)(q−1), the correspondent including a processing unit and a memory, the memory having stored thereon a secret value p, a secret value q, and private key information; said computer readable instructions comprising instructions for:

(a) the correspondent performing modular arithmetic operations in said processing unit to generate a first message component and a second message component, the first message component computed by operating on a message m using a mod p operation, and the second message component computed by operating on said message m using a mod q operation;

(b) the processing unit computing a first blinded exponentiated message component using said first message component, a value derived from a blinding parameter r, and said private key information, and the processing unit computing a second blinded exponentiated message component using said second message component, another value derived from said blinding value r, and said private key information;

(c) the processing unit combining said first blinded exponentiated message component and said second blinded exponentiated message component using a Chinese Remainder Theorem (CRT) algorithm to obtain a blinded exponentiated message of the form $\tilde{s}+r^{(1-e)}m^d$ mod n;

(d) the processing unit validating the blinded exponentiated message by applying the blinded exponentiated message as an input to a function $f(\tilde{s})$ to obtain an output value of the function $f(\tilde{s})$, the output value equalling a predetermined value if the blinded exponentiated message is equal to an expected value of the blinded exponentiated message; and, (e) the processing unit evaluating the output value and when the output value does not equal the predetermined value, the processing unit notifies the correspondent that the validation has failed, and when the output value does equal the predetermined value, the processing unit:
  (i) combining the output value with the blinding parameter r to obtain the unblinding value $r^{f(\tilde{s})}$; and,
  (ii) unblinding the blinded exponentiated message by multiplying the blinded exponentiated message with the unblinding value to obtain the exponentiated message;
  whereby when the output value does not equal the predetermined value, the unblinding value differs from an expected value resulting in a failed unblinding of the blinded exponentiated message, thereby countering a fault injection attack.

8. The non-transitory computer readable medium of claim 7 wherein said predetermined value of said output value of said function is e−1.

9. The non-transitory computer readable medium of claim 7 wherein said first message component is of the form $m_p=m$ mod p, said second message component is of the form $m_q=m$ mod q, said blinding parameter r is an Antipa blinding parameter r randomly generated by said correspondent, said first blinded exponentiated message component is of the form $\tilde{s}_p = r^{(1-e)} m_p^{d_p}$ mod p, and said second blinded exponentiated message component is of the form $\tilde{s}_q = r^{(1-e)} m_q^{d_p}$ mod q, wherein $r_p = r$ mod p, $r_q = r$ mod q, $d_p = d$ mod(p−1), and $d_q = d$ mod(q−1).

10. The non-transitory computer readable medium of claim 9 wherein said instructions further comprise instructions for multiplicatively randomizing said secret value p using a random value $a_1$ generated by said correspondent, and multiplicatively randomizing said secret value q using a random value $a_2$ generated by said correspondent; and wherein said CRT algorithm includes the step of computing said blinded exponentiated message as $\tilde{s}=\tilde{s}_{q*}+[(\tilde{s}_{p*}-\tilde{s}_{q*})(q^{-1} \text{ mod } p) \text{mod } p*]q$ (mod n) wherein p* and q* represent the multiplicatively randomized values of said secret value p and said secret value q respectively.

11. The non-transitory computer readable medium of claim 7 wherein said function $f(\tilde{s})$ is of the form $(mr^e+e-1-(\tilde{s}r^e)^e)$ mod n.

12. The non-transitory computer readable medium of claim 7 wherein said value derived from said blinding parameter and said another value derived from said blinding parameter are the same value.

13. A device in a cryptographic system, wherein the cryptographic system is an RSA system having a private key d and a corresponding public key (n, e) wherein n=pq, gcd(e, ϕ)=1, and ϕ=(p−1)(q−1), the device being configured to perform a method of computing an exponentiated message the form $s=m^d$ mod n; the device including a processing unit and a memory, the memory having stored thereon a secret value p, a secret value q, and private key information; the device being configured for performing the steps of:

(a) performing modular arithmetic operations in said processing unit to generate a first message component and a second message component, the first message component computed by operating on a message m using a mod p operation, and the second message component computed by operating on said message m using a mod q operation;

(b) the processing unit computing a first blinded exponentiated message component using said first message component, a value derived from a blinding parameter r, and said private key information, and the processing unit computing a second blinded exponentiated message component using said second message component, another value derived from said blinding parameter r, and said private key information;

(c) the processing unit combining said first blinded exponentiated message component and said second blinded exponentiated message component using a Chinese Remainder Theorem (CRT) algorithm to obtain a blinded exponentiated message of the form $\tilde{s}=r^{(1-e)} m^d$ mod n; and (d) the processing unit validating the blinded exponentiated message by applying the blinded exponentiated message as an input to a function $f(\tilde{s})$ to obtain an output value of the function $f(\tilde{s})$, the output value equalling a predetermined value if the blinded exponentiated message is equal to an expected value of the blinded exponentiated message; and, (e) the processing unit evaluating the output value and when the output value does not equal the predetermined value, the processing unit notifies the correspondent that the validation has failed, and when the output value does equal the predetermined value, the processing unit:

(i) combining the output value with the blinding parameter r to obtain the unblinding value $r^{f(\tilde{s})}$; and, (ii) unblinding the blinded exponentiated message by multiplying the blinded exponentiated message with the unblinding value to obtain the exponentiated message;

whereby when the output value does not equal the predetermined value, the unblinding value differs from an expected value resulting in a failed unblinding of the blinded exponentiated message, thereby countering a fault injection attack.

14. The device of claim 13 wherein said predetermined value of said output value of said function is e−1.

15. The device of claim 13 wherein said first message component is of the form $m_p$=m mod p, said second message component is of the form $m_q$=m mod q, said blinding parameter r is an Antipa blinding parameter r randomly generated by said correspondent, said first blinded exponentiated message component is of the form $\tilde{s}_p=r^{(1-e)}m_p^{d_p}$ mod p, and said second blinded exponentiated message component is of the form $\tilde{s}_q=r^{(1-e)}m_q^{d_q}$ mod q, wherein $r_p$=r mod p, $r_q$=r mod q, $d_p$=d mod(p−1), and $d_q$=d mod(q−1).

16. The device of claim 15 wherein said device is further configured for multiplicatively randomizing said secret value p using a random value $a_1$ generated by said random number generator, and multiplicatively randomizing said secret value q using a random value $a_2$ generated by said random number generator; and wherein said CRT algorithm includes the step of computing said blinded exponentiated message as $\tilde{s}=\tilde{s}_{q*}+[(\tilde{s}_{p*}-\tilde{s}_{q*})(q^{-1}\text{mod } p)\text{mod } p*]q(\text{mod } n)$ wherein p* and q* represent the multiplicatively randomized values of said secret value p and said secret value q respectively.

17. The device of claim 13 wherein said function $f(\tilde{s})$ is of the form $(mr^e+e-1-(\tilde{s}r^e)^e)$ mod n.

18. The device of claim 13 wherein said value derived from said blinding parameter r and said another value derived from said blinding parameter r are the same value.

* * * * *